(12) United States Patent
Le Brazidec et al.

(10) Patent No.: US 8,386,916 B2
(45) Date of Patent: Feb. 26, 2013

(54) SYSTEMS AND METHODS TO CREATE A MULTIDIMENSIONAL EXPRESSION CALCULATED MEMBER IN A SPREADSHEET CELL

(75) Inventors: Pierre Jean Le Brazidec, Guichen (FR); Florent Migeon, Clichy (FR); Stéphane Defauconpret, Brunoy (FR); David Guillemet, Paris (FR); Stéphane Debart, Houilles (FR)

(73) Assignee: SAP France S.A., Levallois-Perret (FR)

( * ) Notice: Subject to any disclaimer, the term of this patent is extended or adjusted under 35 U.S.C. 154(b) by 655 days.

(21) Appl. No.: 12/344,757

(22) Filed: Dec. 29, 2008

(65) Prior Publication Data

US 2010/0169759 A1    Jul. 1, 2010

(51) Int. Cl.
*G06F 17/30* (2006.01)
(52) U.S. Cl. ........................................... 715/219
(58) Field of Classification Search .................. 715/219
See application file for complete search history.

(56) References Cited

U.S. PATENT DOCUMENTS

| 7,805,433 | B2 * | 9/2010 | Dickerman et al. ........... 707/713 |
| 2003/0009649 | A1 * | 1/2003 | Martin et al. .................... 712/1 |
| 2009/0292730 | A1 * | 11/2009 | Li et al. ...................... 707/104.1 |

\* cited by examiner

*Primary Examiner* — Laurie Ries
*Assistant Examiner* — Tionna Smith
(74) *Attorney, Agent, or Firm* — Buckley, Maschoff & Talwalkar LLC

(57) ABSTRACT

According to some embodiments, a system, method, means, and/or computer program code are provided to facilitate use of a spreadsheet application to access information stored in a multidimensional data source. Some embodiments include receiving, at an analyzer module, a change indication from the spreadsheet application. The change indication may be, for example, associated with a spreadsheet formula of the spreadsheet application entered by a user into a spreadsheet cell. In response to the change indication, the spreadsheet formula may be translated into a multidimensional expression calculation associated with the multidimensional data source. The spreadsheet formula in the spreadsheet cell may then be automatically replaced with information associated with the multidimensional expression calculation.

19 Claims, 13 Drawing Sheets

| | A | B | C | D | E | F |
|---|---|---|---|---|---|---|
| 1 | | | DEC. 2004 | DEC. 2005 | DEC. 2006 | EXCEL FORM |
| 2 | | TR100-SALES | 403,000 | 754,000 | 459,000 | -351,000 |
| 3 | | TR310- GROSS MARGIN | 256,000 | 514,000 | 167,000 | -258,000 |
| 4 | | TR300-OPERATING PROFIT | 195,000 | 416,000 | -53,000 | -221,000 |
| 5 | | TR800-NET PROFIT | 238,000 | 824,000 | 327,000 | -586,000 |
| 6 | | | | | | |
| 7 | | | | | | |
| 8 | | | | | | |
| 9 | | | | | | |

|   | A | B | C | D | E | F |
|---|---|---|---|---|---|---|
| 1 |   |   |   |   |   |   |
| 2 |   |   | DEC. 2004 | DEC. 2005 | DEC. 2006 | EXCEL FORM |
| 3 |   | TR100-SALES | 403,000 | 754,000 | 459,000 | -351,000 |
| 4 |   | R11-EXTERNAL SALES | 300,000 | 500,000 | 300,000 | -200,000 |
| 5 |   | R12-INTERNAL SALES | 103,000 | 254,000 | 159,000 | -151,000 |
| 6 |   | TR310- GROSS MARGIN | 256,000 | 514,000 | 167,000 | -258,000 |
| 7 |   | TR300-OPERATING PROFIT | 195,000 | 416,000 | -53,000 |   |
| 8 |   | TR800-NET PROFIT | 238,000 | 824,000 | 327,000 |   |
| 9 |   |   |   |   |   |   |

FIG. 4

|   | A | B | C | D | E |
|---|---|---|---|---|---|
| 1 |   |   |   |   |   |
| 2 |   |   | DEC. 2004 | DEC. 2006 | EXCEL FORM |
| 3 |   | TR100-SALES | 403,000 | 459,000 | #REF! |
| 4 |   | R11-EXTERNAL SALES | 300,000 | 300,000 | #REF! |
| 5 |   | R12-INTERNAL SALES | 103,000 | 159,000 | #REF! |
| 6 |   | TR310- GROSS MARGIN | 256,000 | 167,000 | #REF! |
| 7 |   | TR300-OPERATING PROFIT | 195,000 | -53,000 |   |
| 8 |   | TR800-NET PROFIT | 238,000 | 327,000 |   |
| 9 |   |   |   |   |   |

|   | A | B | C | D | E | F |
|---|---|---|---|---|---|---|
| 1 |   |   |   |   |   |   |
| 2 |   |   | DEC. 2004 | DEC. 2005 | DEC. 2006 | TEST |
| 3 |   | TR100-SALES | 403,000 | 754,000 | 459,000 | =D3-E3 |
| 4 |   | TR310- GROSS MARGIN | 256,000 | 514,000 | 167,000 |   |
| 5 |   | TR300-OPERATING PROFIT | 195,000 | 416,000 | -53,000 |   |
| 6 |   | TR800-NET PROFIT | 238,000 | 824,000 | 327,000 |   |
| 7 |   |   |   |   |   |   |
| 8 |   |   |   |   |   |   |
| 9 |   |   |   |   |   |   |

| SUM | FX | =D3-E3 |
|---|---|---|

FIG. 7

| | A | B | C | D | E | F |
|---|---|---|---|---|---|---|
| 1 | | | | | | |
| 2 | | | DEC. 2004 | TEST | | |
| 3 | | TR100-SALES | 403,000 | 295,000 | | |
| 4 | | TR310- GROSS MARGIN | 256,000 | 347,000 | | |
| 5 | | TR300-OPERATING PROFIT | 195,000 | 469,000 | | |
| 6 | | TR800-NET PROFIT | 238,000 | 497,000 | | |
| 7 | | | | | | |
| 8 | | | | | | |
| 9 | | | | | | |

FIG. 10

SYSTEMS AND METHODS TO CREATE A MULTIDIMENSIONAL EXPRESSION CALCULATED MEMBER IN A SPREADSHEET CELL

FIELD

Some embodiments of the present invention relate to business information, business intelligence, and/or enterprise systems. In particular, some embodiments relate to systems and methods to create a multidimensional expression calculated member for a spreadsheet cell associated with information from one or more business information, business intelligence, and/or enterprise system databases.

BACKGROUND

A business information, business intelligence, and/or enterprise system can improve an organization's ability to monitor and manage data in a complex business environment. For example, the systems offered by Business Objects SA of Levallois-Perret, France and SAP AG of Walldorf, Germany, provide components and tools that allow users to monitor, retrieve, view and manipulate business information, including business warehouse data stored and maintained as part of a company's overall business intelligence tools. By way of examples only, business information might be associated with a number of different product lines, profit values, customer groups, fiscal years, distribution regions, product costs, product quantities, revenues, and/or dates. Moreover, the business information may be stored and retrieved in a variety of ways. Examples of data sources include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC) and the like.

In some cases, a user needs to retrieve some of the stored business information according to various intents, such as to: explore the information, create a display or report that shows the information and the like. The user may, for example, import a particular set of information into a spreadsheet application by entering a name or identifier into various cells in a spreadsheet to define what information should be associated with those cells, rows, and/or columns. For example, the user may associate a particular row with a measure such as profit and a number of columns with different fiscal years, where the years are associated with a dimension. Measures and dimensions may be defined, for example, in a metadata model associated with the stored business information. To associate a particular cell, row, and/or column with particular types of business information, a user may enter an identifier into a spreadsheet cell. For example, a user might type product names into a number of different cells in order to create a report showing how profitable each product was in a given year.

A user might also arrange for some spreadsheet cells to display information based on other cells in the spreadsheet. For example, a user might indicate that one particular cell should display a value representing the addition of values from two other particular cells (e.g., a cell representing "global sales" might display the result of adding the value of a cell representing "northern hemisphere sales" to the value of a cell representing "southern hemisphere sales"). In some cases, however, it can be difficult to enter and maintain appropriate the formulas and results in the spreadsheet. For example, if a formula is defined using a spreadsheet application it may be difficult to update the results of the formula as appropriate when columns and/or rows in a spreadsheet are changed. Moreover, providing a separate, dedicated formula definition editor may be confusing to users and lead to errors.

It would therefore be desirable to provide improved methods and systems that facilitate an efficient access and display of business information by a user, including situations where a spreadsheet application displays information associated with formulas.

BRIEF DESCRIPTION OF THE DRAWINGS

FIGS. 3-5 illustrate examples of spreadsheet user displays.

FIG. 7 illustrates a spreadsheet user display where a user is entering a spreadsheet formula according to some embodiments.

FIG. 10 illustrates a spreadsheet user display after source cells have been deleted according to some embodiments.

DETAILED DESCRIPTION

To alleviate problems inherent in the prior art, some embodiments of the present invention introduce systems, methods, computer program code and/or means to create a multidimensional expression calculated member for a spreadsheet cell associated with information from one or more business information, business intelligence, and/or enterprise system databases. Some embodiments are described herein as accessing Online Analytic Programming (OLAP) information associated with a multidimensional data schema. Note, however, that embodiments may be associated with other types of information including data described by a metadata model (e.g., which may itself include metadata structures) associated with the data. Such data can include information stored in one or more data sources, such as relational databases.

Figure 1:
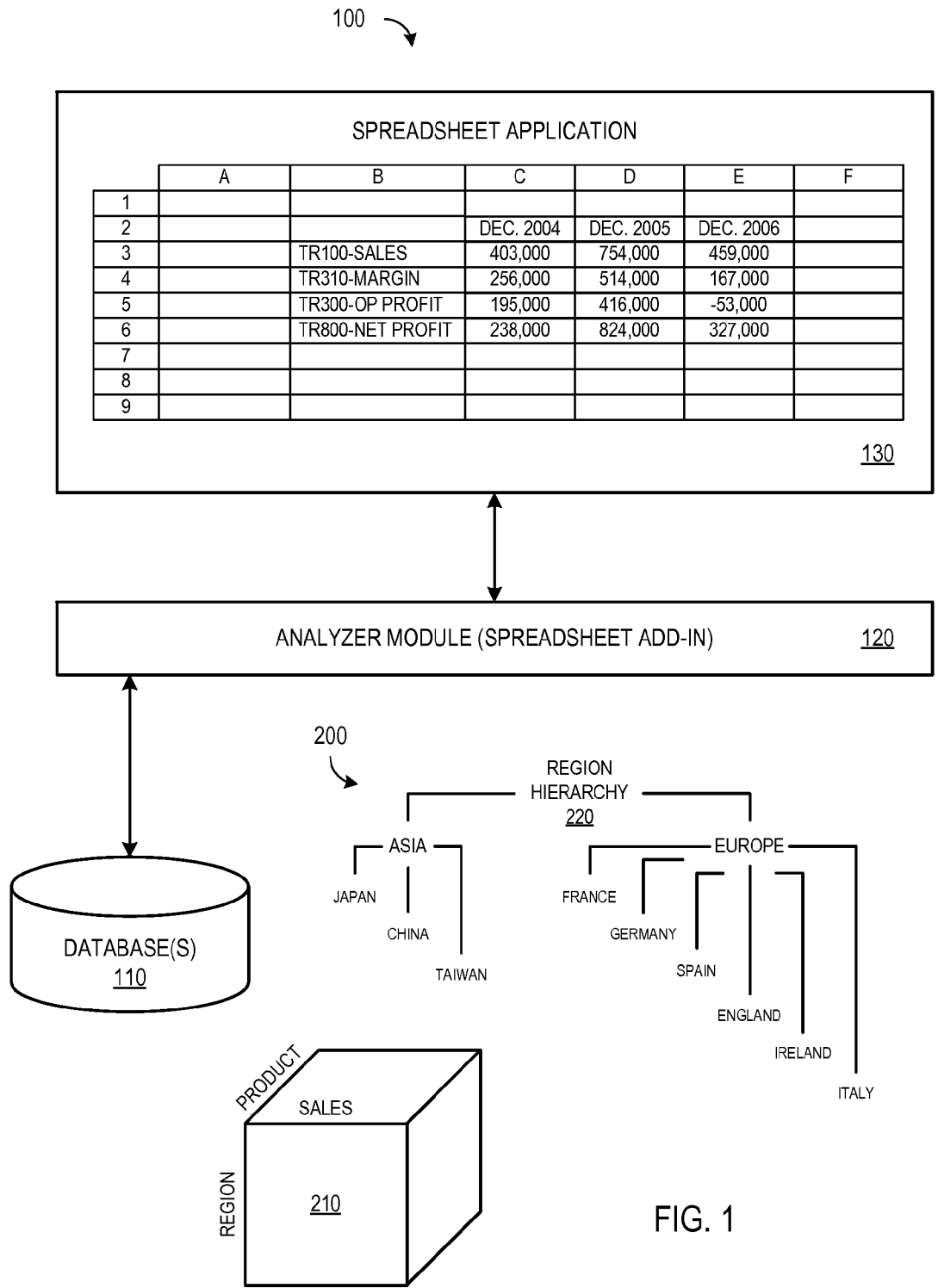
FIG. 1 is a diagram of a system according to some embodiments of the present invention.
Figure 2:
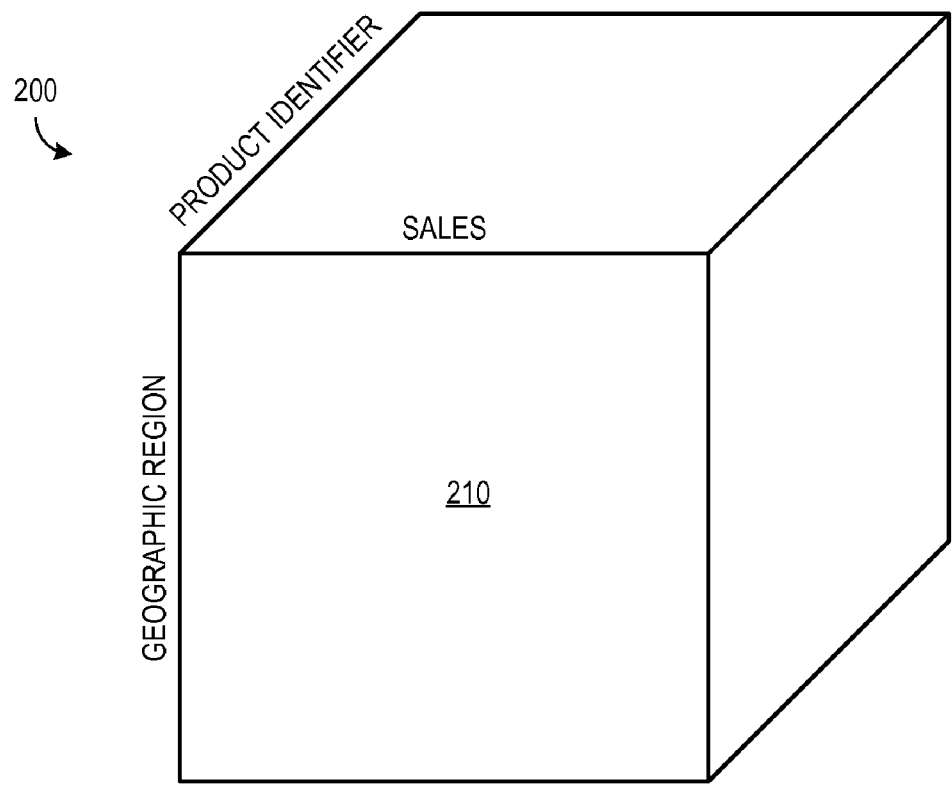
FIG. 2 illustrates how information is stored and/or accessed in accordance with some embodiments of the present invention.
Figure 2:
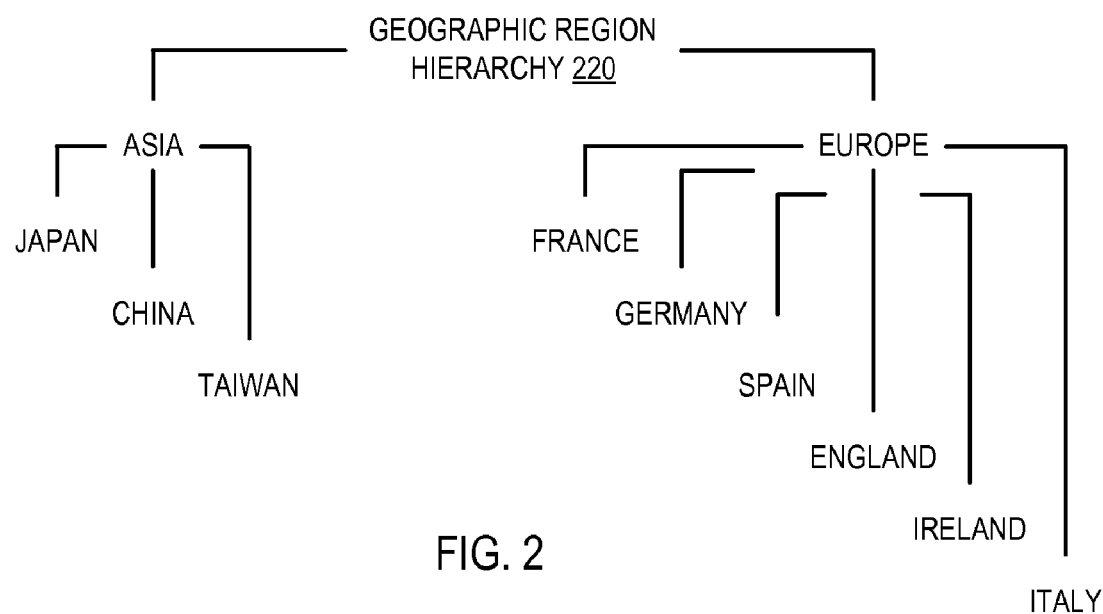

FIG. 1 is a diagram of a system 100 according to some embodiments of the present invention. The system 100 includes one or more databases 110 that may store information, such as business information. For example, FIG. 2 illustrates information 200 that might be stored and/or accessed in accordance with some embodiments of the present invention. In particular, the information 200 includes an OLAP cube 210. An OLAP cube 210 or hypercube may comprise, for example, a data structure storing financial information as numeric facts (or "measures") categorized by dimensions. The OLAP cube 210 may include or be associated with a metadata model that describes aspects of the cube, such as, the measures, the dimensions, the relationships or hierarchy of the dimensions, and the like. Although an OLAP cube 210 is illustrated in FIG. 2, note that embodiments may be associated with other types of data sources, such as another type of multidimensional data source, or a data source that includes dimension and measure data. The OLAP cube 210 illustrated in FIG. 2 stores measures associated with sales, product identifier, and geographic region dimensions. Note that the OLAP cube 210 may store information in accordance with any number of dimensions. In some embodiments, the stored information 200 may be accessed using Multidimensional Expressions (MDX) which is a declarative query and data manipulation language similar to Structured Query Language ("SQL") but adapted for multidimensional data.

The stored information 200 may include and/or be described by a metadata model. The metadata model may, for example, include relationships between data elements, common and multilingual names for the elements, descriptions of elements, data lineage for data elements, and the like. The stored information 200 may, in some cases, be arranged in a hierarchy structure 220 providing a series of parent-child relationships (e.g., where a parent member represents a consolidation of children members). A hierarchy usually has more than one level and may or may not be symmetrical. Symmetry for hierarchies includes balance (where all branches end at the same level), leveling (where all members on a certain level are derived from a single source), and the like.

For example, the hierarchy structure 220 illustrated in FIG. 2 organizes the geographic region dimension in a first level as representing either "Asia" or "Europe." Moreover, the "Europe" region is further organized at a lower level as including the following sibling regions: "France," "Germany," "Spain," "England," "Ireland," and "Italy." According to some embodiments, each region might be further related to other dimensions of information of the OLAP cube 210 (e.g., yearly sales figures and operating profits).

Referring again to FIG. 1, an analyzer module 120 may act as an interface between the databases 110 and a spreadsheet application 130. The spreadsheet application 130 might be associated with, for example, the spreadsheet programs Microsoft® Excel®, Apple® Numbers® and IBM® Lotus 1-2-3®, online spread sheet programs and the like. The analyzer module 120 might comprise, for example, a spreadsheet add-in such as the BusinessObjects Extended Analytics Analyzer Excel Add-In from Business Objects SA. As used herein, a spreadsheet "add-in" may refer to, for example, a plug-in component or module that executes in association with a spreadsheet application to provide additional functionality for a user. Note that that the analyzer module 120 and the spreadsheet application 130 might execute at a first device (e.g., a user PC or workstation) while the databases 110 are stored at a second device, remote from the first device. According to some embodiments, some or all of the information in the databases 110 may be co-located with the device executing the analyzer module 120 and spreadsheet application 130. According to still other embodiments, some or all of the spreadsheet application 130 executes via a web based interface.

According to some embodiments, a user may define and view a spreadsheet, using the spreadsheet application 130, in order to have free form access to the information in the databases 110. For example, FIG. 3 illustrates a spreadsheet user display 300 that includes cell rows (rows 1 through 9) and columns (columns A through F). Note that the display 300 illustrated in FIG. 3 may only represent a small portion of an actual spreadsheet. For example, a spreadsheet might include thousands of rows and/or columns.

A user may select one or more of the spreadsheet cells to represent a currently active cell. For example, a user might position a cursor over a cell and perform an action (e.g., a mouse click) to designate that cell as the currently active cell (such as cell F3 represented as bold in FIG. 3). The active cell may be associated with the formula interface area 310

The spreadsheet user display 300 may help a user access and understand the information stored in, for example, the OLAP cube 210. In FIG. 3, the user has created a spreadsheet such that the cells in rows 3 through 6 of column B define four financial categories (sales, gross margin, operating profit, and net profit) while the cells in columns C through E of row 2 define sales periods (December 2004 through December 2006, respectively). The analyzer module 120 may retrieve information from the OLAP cube 210 and insert the proper numerical values in the spreadsheet (e.g., to indicate that net profit for December 2005 was "824,000" as displayed in cell D6 of the spreadsheet 300).

The analyzer module 120 may store and/or recognize information in cells using pre-determined types of formulas. For example, the analyzer module 120 might store and/or recognize the following type of formula in spreadsheet cells:

=AnalyzerOLAPMember(fullName, displayName)

where displayName is a string representing what should be shown on the user's display and fullName defines where the information is actually stored in the OLAP cube 210. The full name may correspond to an element in the metadata model associated with the OLAP cube 210. By way of example only, a particular cell might contain the formula:

=AnalyzerOLAPMember("[Region].[Europe].
    [France]", "France")

Note that such a formula might include other parameters, such as a unique identifier associated with the data (e.g., a unique alphanumeric string that might be used to correlate information even when a display name and/or full name has been changed), dimension information, hierarchy information, and/or metadata.

Note that each cell in the spreadsheet user display 300 may contain content, such as a numeric value, text, an image, or a formula. According to some embodiments, the spreadsheet user display 300 may further include graphical representations (e.g., charts) representing the content of the various cells.

By way of example, a user has used the formula interface area 310 to enter an Excel formula of "C3-D3" for the active cell of FIG. 3 (cell F3). That is, the user intends the value of cell F3 to represent the sales from December 2004 subtracted by the sales from December 2005. As a result, the spreadsheet application 130 may automatically compute a value (based on the current content stored in cells C3 and D3) to be displayed in the active cell F3. In the example of FIG. 3, similar operations are performed for each of the cells F3 through F6 (labeled as Excel Formulas or "EXCEL FORM" in the spreadsheet).

Note, however, that when a formula associated with an external database 110, such as an OLAP cube 210, is defined using a spreadsheet application (e.g., via the formula interface area 310) it may be difficult to update the results of the formula as appropriate when columns and/or rows in a spreadsheet are changed. Consider what might happen, for example, if two new rows were added to the spreadsheet user display 300 illustrated in FIG. 3 between existing rows 3 and 4. FIG. 4 illustrates such a display 400 where two new rows—representing OLAP children of row 3—have been added (and prior rows 4 through 6 have been moved down to now occupy rows 6 through 8). In this case, the spreadsheet application may fail to update values of F7 and F8 as appropriate (as indicated by the empty cells in FIG. 4).

Similarly, consider what might happen if column D was to be completely deleted from the display 400 of FIG. 4. FIG. 5 illustrates such a display 500 (and prior columns E and F have been moved left to now occupy columns D and E). In this case, the spreadsheet application might be completely unable to update the values in cells E3 through E6 at all (as indicated by the "#REF!" error message in FIG. 5). Note that one of the needed values for the result to be to computed as originally intended by the user is no longer even present in the spreadsheet (namely, sales from December 2005)—although that value is presumably still present in the external database 110 and/or OLAP cube 210.

To avoid such problems, a dedicated formula definition editor may be provided to let a user define a formula that directly accesses the external database 110 and/or OLAP cube 210 using, for example, a Multi-Dimensional expression (MDX) language. Such a formula definition editor, may be unfamiliar to many users (such as business users) and the specific syntax associated with the editor may be confusing and lead to errors.

Note that the analyzer module 120 may comprise a registered automation add-in of the spreadsheet application 130 that receives notifications from the spreadsheet application 130 in the form of "events." For example, the spreadsheet application 130 might issue an event to the analyzer module 120 whenever the active cell is changed by the user.

Figure 6:
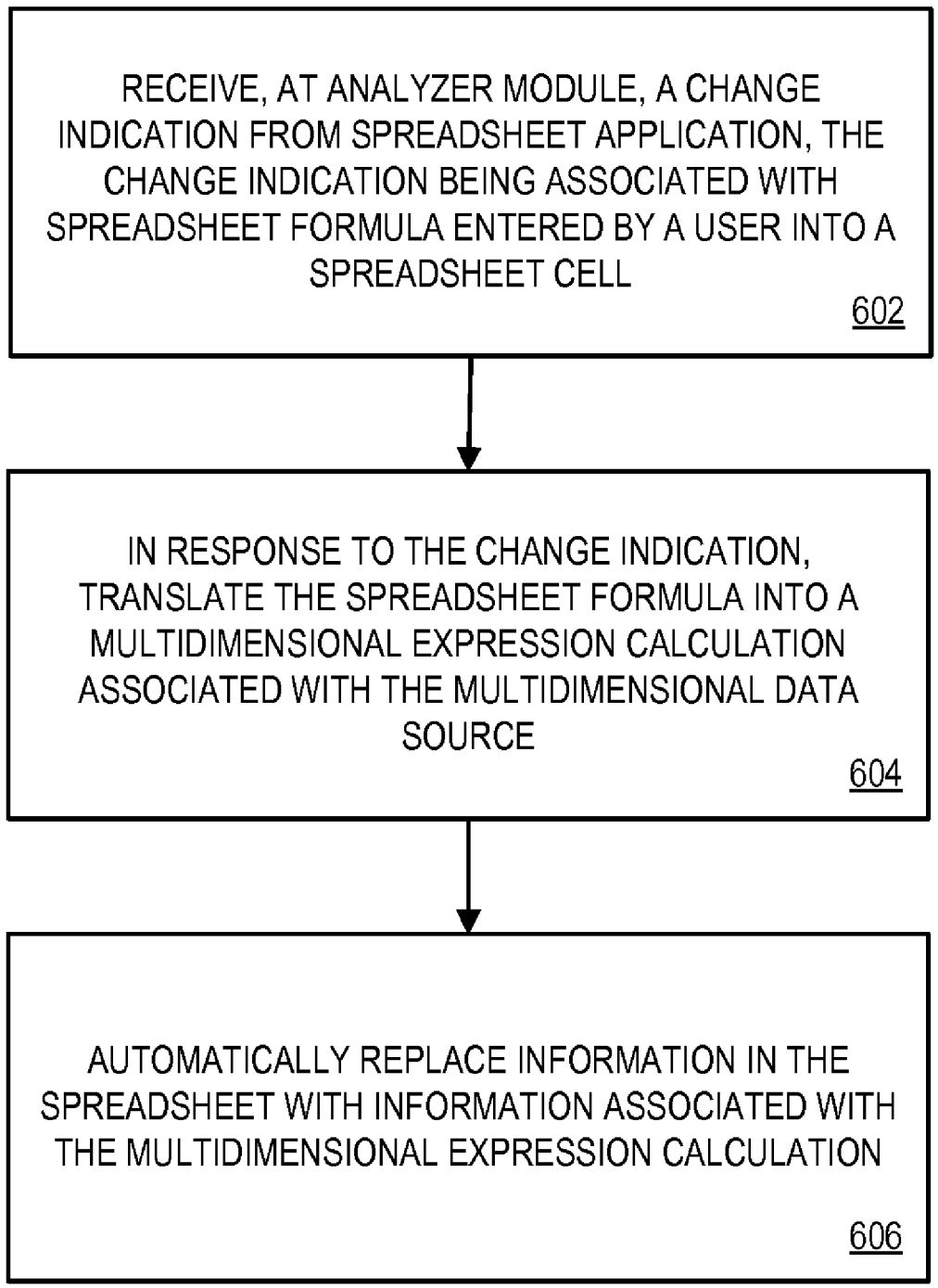
FIG. 6 is a flow diagram of a method for operating an analyzer module and spreadsheet application according to some embodiments of the present invention.

According to some embodiments, events from the spreadsheet application 130 generated "on the fly" (e.g., as the user enters information and before a report is validated) may be advantageously used by the analyzer module 120 to facilitate an access of business information stored in the databases 110. For example, FIG. 6 is a flow diagram depicting process steps for operating an analyzer module and spreadsheet application that may be performed by the business information enterprise system 100 of FIG. 1. The flow charts described herein do not necessarily imply a fixed order to the actions, and embodiments may be performed in any order that is practicable. Note that any of the methods described herein may be performed by hardware, software (including low level language code), firmware, or any combination of these approaches. For example, a storage medium may store thereon instructions that when executed by a machine result in performance according to any of the embodiments described herein.

At 602, a change indication may be received at an analyzer module. For example, the analyzer module might receive an indication of a change event from a spreadsheet application when a user enters a spreadsheet formula into a cell.

In response to the change indication, the spreadsheet formula may be translated into a multidimensional expression calculation at 604 (e.g., using a language and/or syntax associated with the multidimensional data source). For example, the analyzer module might compare the formula a list of equivalent expression associated with a multidimensional data source. Note that the translation performed at 604 may be "dynamic," for example, because it is performed as a user enters information (instead of when an entire report is validated). According to some embodiments, the translation is only performed at 604 when certain conditions are satisfied (e.g., as described in connection with FIG. 13).

At 606, information in the spreadsheet may be replaced with information associated with the multidimensional expression calculation. For example, the analyzer module might automatically insert an appropriate AnalyzerOLAPMember formula, including appropriate member identifiers associated with source cells of the user-entered formula, into the currently active cell based on the formula entered by the user. Note that this may be performed automatically (e.g., without further inputs from the user) and/or dynamically (e.g., immediately after the user enters information into a cell and prior to a report validation). According to some embodiments, an indication may be provided to the user to confirm that the dynamic determination and replacement were successfully performed (e.g., the active cell might flash and/or change color on the display). According to another embodiment, an indication is provided to the user when the translation and replacement were not successfully performed (e.g., a sound might indicate that no equivalent MDX expression was found).

By way of example, consider FIG. 7 which illustrates a spreadsheet user display 700 that includes cell rows (rows 1 through 9) and columns (columns A through F) where a user has selected spreadsheet cell F3 to represent the currently active cell. Note that the user has created a spreadsheet such that the cells in rows 3 through 6 of column B define four financial categories (sales, gross margin, operating profit, and net profit) while the cells in columns C through E of row 2 define sales periods (December 2004 through December 2006, respectively). The analyzer module 120 may retrieve information from the OLAP cube 210 and insert the proper numerical values in the spreadsheet (e.g., to indicate that net profit for December 2005 was "824,000" as displayed in cell D6 of the spreadsheet 300).

Moreover, a user has utilized a formula interface area 710 to enter an Excel formula of "D3-E3" for the active cell (cell F3). That is, the user intends the value of cell F3 to represent the sales from December 2005 subtracted by the sales from December 2006. As a result, the spreadsheet application 130 may automatically compute a value (based on the current content stored in cells D3 and E3) to be displayed in the active cell F3.

When the user enters this formula, the spreadsheet application may transmit a change event signal to the analyzer module. As a result, the system may automatically create a custom member with an appropriate MDX expression based at least in part on the user-entered spreadsheet formula. The dimension members used in the MDX expression may be retrieved, for example, based on the cells involved in the Excel formula references. In the example of FIG. 7, note that cells D3 and E3 are referenced in the Excel formula. When reading the formula, the analyzer module may retrieve the columns of the report and/or spreadsheet involved (e.g., December 2005 and December 2006) and thus be able to retrieve the corresponding column headers members that will be used in the MDX expression. The Excel references may, according to some embodiments, be of any kind (e.g., absolute or relative) since they are evaluated once (e.g., when the Excel formula is converted).

If the user had previously entered a name in a corresponding header part of the spreadsheet, the system may use that string it to name the custom member. For example, if the user had entered "Test" into cell F2 before entering the spreadsheet formula as illustrated in FIG. 7, the customer member might be assigned that name. If no name was previously entered by the user, a name might be automatically generated by the analyzer module based on the OLAP members involved in the formula. The automatic name may be generated, for example, by concatenating all the dimension member captions involved in the formula. If such a name already exists, a number could be added at the end of the generated string to make it unique.

Figure 8:
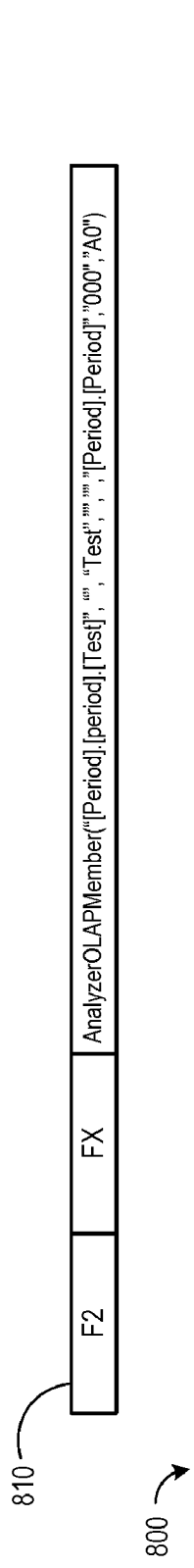
FIG. 8 illustrates a spreadsheet user display where the user-entered formula has been replaced with automatically created and persistent MDX calculated members according to some embodiments.

Once the formula is converted, the custom member can be inserted into the appropriate row/column and the report/spreadsheet may be refreshed (e.g., so that the expression may be evaluated for each row in the case of a "column" formula or for each column in the case of a "row" formula). FIG. 8 illustrates a display 800 after the conversion and insertion. Note that area 810 reflects the newly generated AnalyzerOLAPMember information that has been generated.

Figure 9:
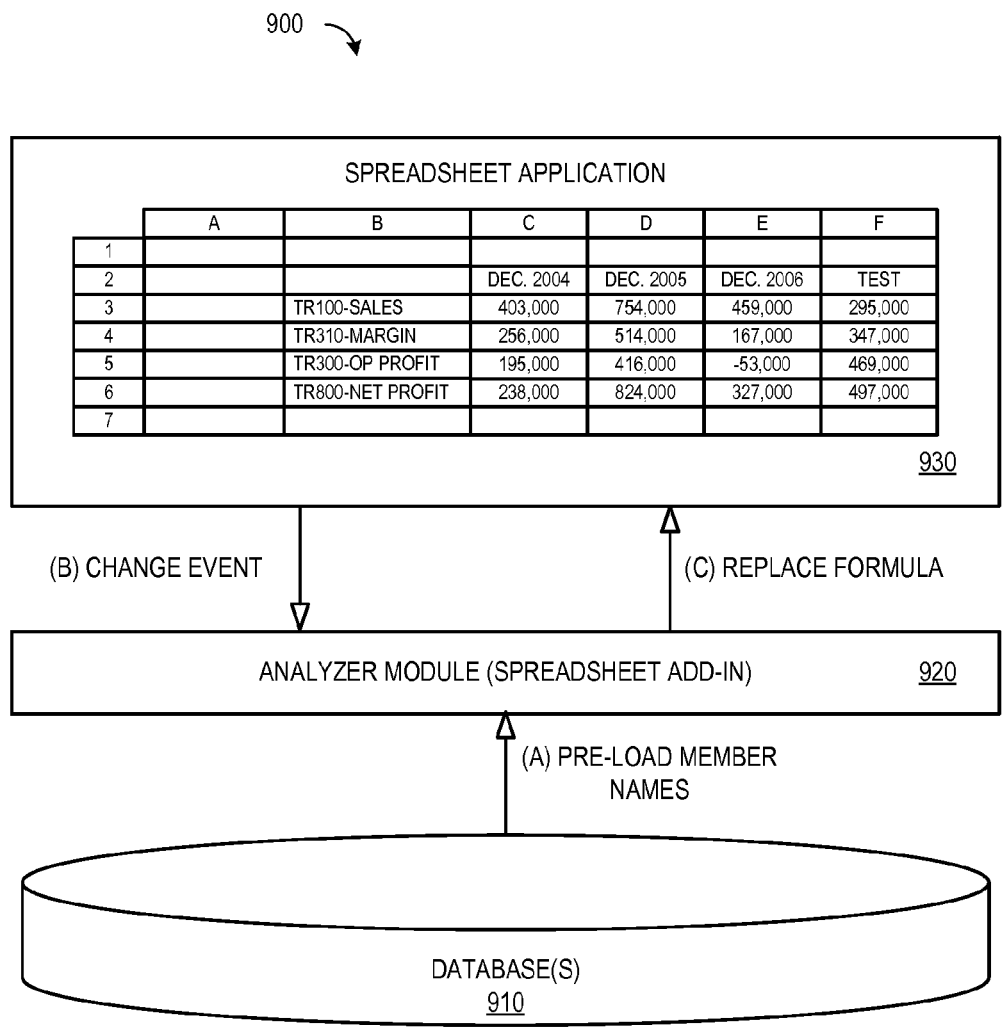
FIG. 9 is an information flow diagram according to some embodiments of the present invention.

FIG. 9 is an information flow diagram 900 according to some embodiments of the present invention. The diagram 900 may be associated with, for example, steps that facilitate a display of information stored in one or more external databases 910 (e.g., one or more multidimensional data sources). The external databases 910 may, for example, store information about members such that at least some members are siblings of other members. According to some embodiments, the external databases 910 further store a metadata structure defining a hierarchy for the members. As used herein the "external" databases 910 may include one or more databases remote from a device executing a spreadsheet application 930 and an analyzer module 920 (e.g., an add-in or plug-in component of the spreadsheet application 930).

At action (A), the analyzer module 920 pre-loads information associated with a plurality of members of the databases 910. For example, the analyzer module 920 might pre-load a list of dimension and/or member name strings from the databases 910. According to some embodiments, the pre-loading is performed by issuing a query to the external databases 910 asking for information dimension and/or member names. This information may, for example, include member names to help the analyzer module 920 evaluate and/or convert data associated formulas entered by a user.

At action (B), the analyzer module 920 receives a change event from the spreadsheet application 930. In particular, the change event indicates that new content has been placed into a spreadsheet cell (e.g., a new formula has been entered by a user).

The analyzer module 920 then compares the content with one or more conditions and/or the pre-loaded information. For example, the analyzer module 920 might search a list of locally stored information, such as known MDX expressions, dimension names, and/or member name strings, in an attempt to match (or partially match) some of the information in the formula. When a match is found, the analyzer module 920 automatically creates a formula to be placed into a spreadsheet cell. At action (C), the analyzer module 920 loads the automatically created formula into the appropriate cell via the spreadsheet application 930.

Consider again the example of FIG. 8 where an MDX calculated members were automatically created for cells F4 through F6. That is, the value representing sales for December 2005 minus sales for December 2006 is displayed in cell F3, the value representing gross margin for December 2005 minus gross margin for December 2006 is displayed in cell F4, etc.

Now, consider what might happen if columns D and E were completely deleted from the display 800 of FIG. 8. FIG. 10 illustrates such a display 1000 (and prior column F has been moved left to now occupy column D). In this case, the spreadsheet application itself would be completely unable to update the values in cells D3 through D6 at all. Both of the values needed to compute each cell as originally intended by the user are no longer even present in the spreadsheet (namely, the data from December 2005 and 2006). However, since a persistent MDX calculated member was generated by the analyzer module (and that information is still present in the external database 110 and/or OLAP cube 210), the display 1000 is updated as appropriate. In this way, some embodiments of the present invention may "persist" information associated with a multidimensional expression calculation in a spreadsheet cell even when a cell associated with an original formula's source member is deleted or moved. That is, the calculated member is not linked to particular spreadsheet cells but instead persist in the data source. According to some embodiments, the calculated member may be stored "behind the scenes" in the spreadsheet application itself (e.g., and not in the data source). Moreover, calculated members (e.g., those created on the fly or using an editor) may be stored in the spreadsheet associated with a data source name.

Figure 11:
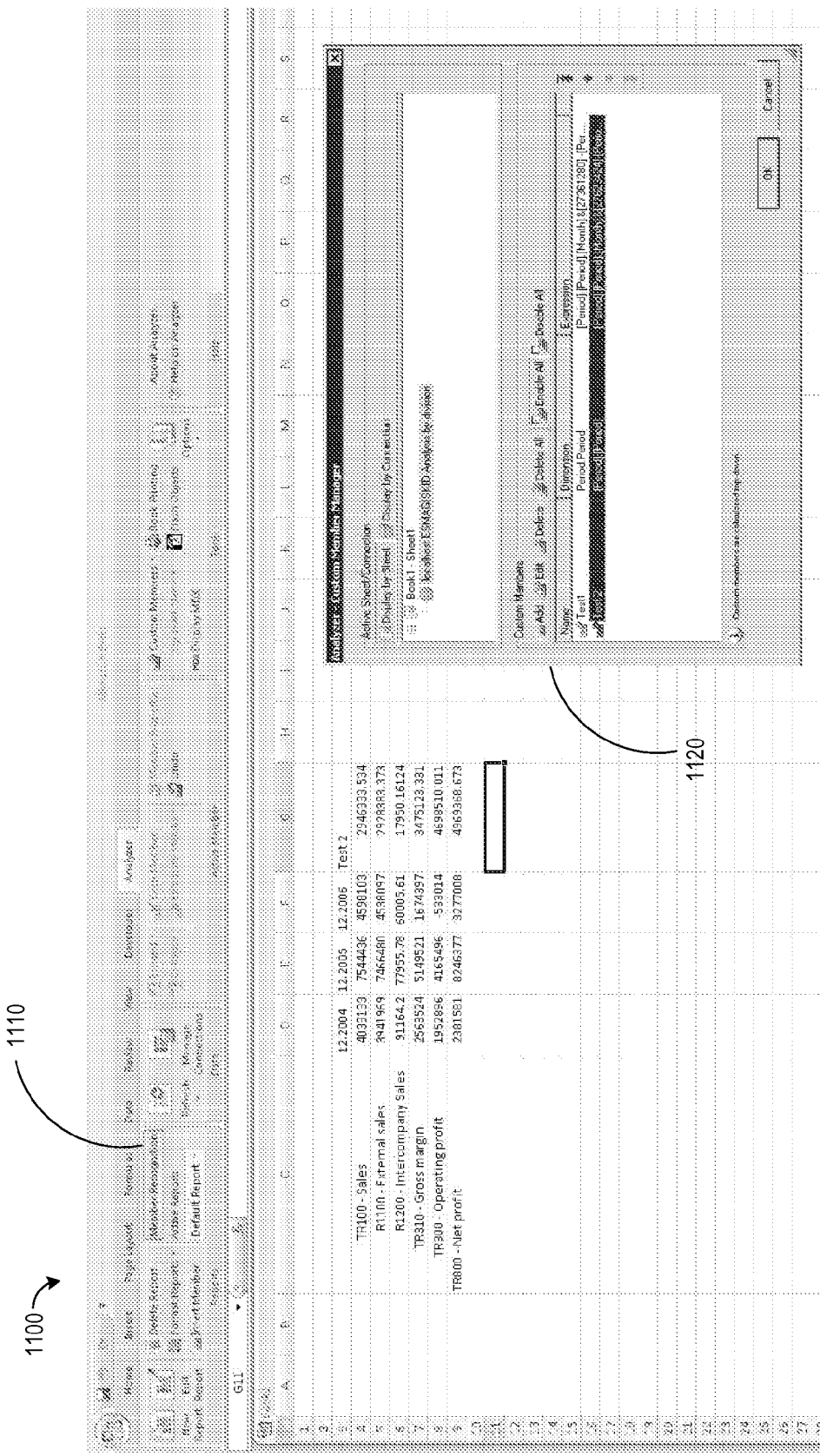
FIG. 11 is exemplary embodiment of a user interface illustrating the present invention.

FIG. 11 is one embodiment of a user interface 1100 illustrating the present invention. Note that in some cases, a user might not want the analyzer module to automatically translate and/or replace his or her spreadsheet formulas. In this case, a member recognition icon 1110 may be provided to let the user activate and/or deactivate such a feature. Moreover, any MDX calculated members that are automatically generated by the analyzer module might still be available via a customer member manager 1120 that lets a user add, edit, delete, and/or enable (or disable) the formulas that have been created in accordance with any of the embodiments described herein.

Figure 12:
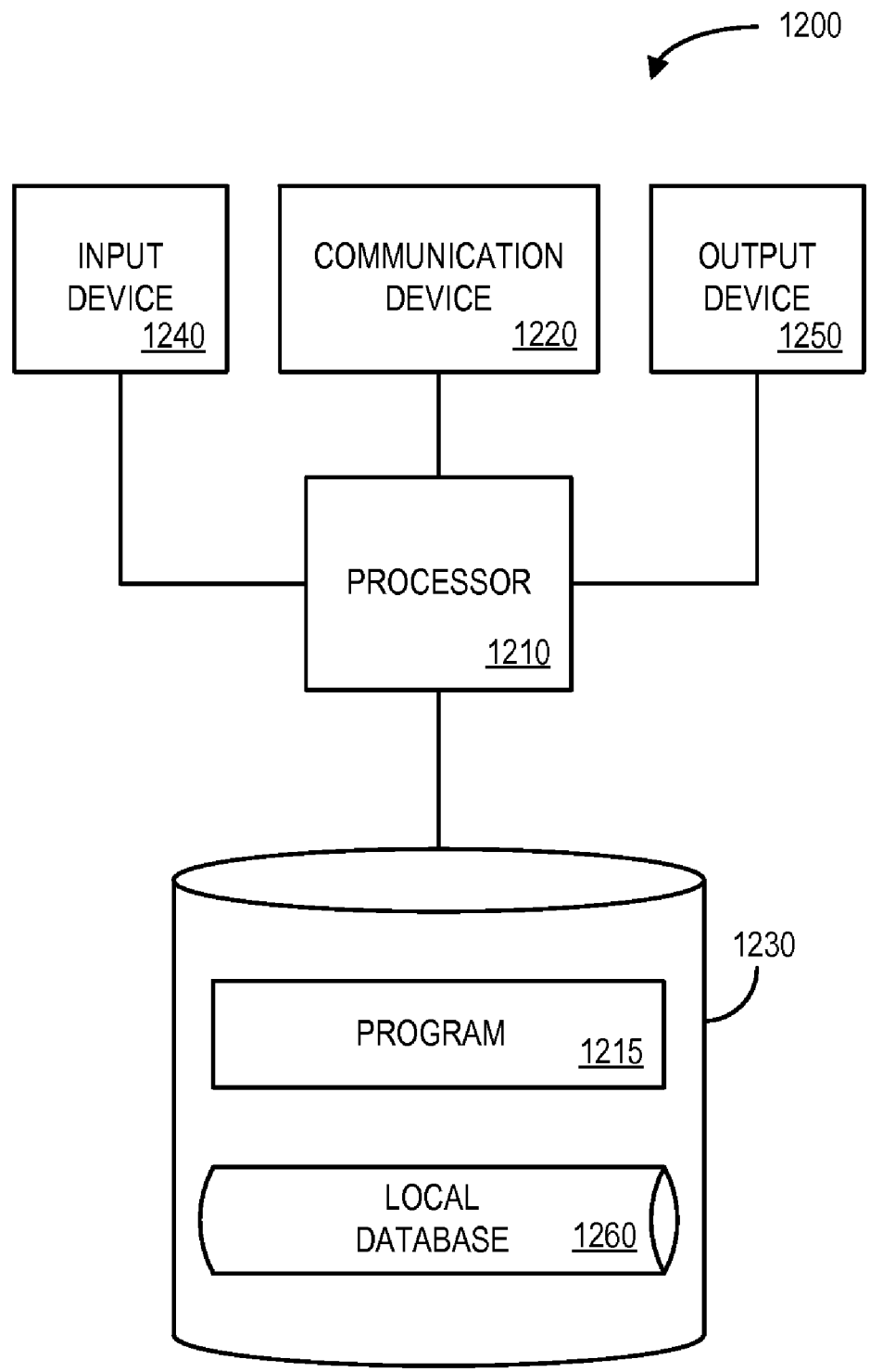
FIG. 12 is a block diagram of an apparatus in accordance with some embodiments of the present invention.

FIG. 12 is a block diagram of an apparatus 1200 in accordance with some embodiments of the present invention. The apparatus 1200 might, for example, execute a spreadsheet application and a spreadsheet plug-in or module similar to analyzer module 120 illustrated in FIG. 1. The apparatus 1200 comprises a processor 1210, such as one or more INTEL® Pentium® processors, coupled to a communication device 1220 configured to communicate via a communication network (not shown in FIG. 12). The communication device 1220 may be used to exchange OLAP or other business information, for example, with one or more multidimensional data sources (e.g., associated with remote databases or other devices).

The processor 1210 is also in communication with an input device 1240. The input device 1240 may comprise, for example, a keyboard, a mouse, or computer media reader. Such an input device 1240 may be used, for example, to select an active cell and/or to enter spreadsheet formulas associated with the active cell (or group of cells). The processor 1210 is also in communication with an output device 1250. The output device 1250 may comprise, for example, a display screen or printer. Such an output device 1250 may be used, for example, to provide reports and/or display business information to the user.

The processor 1210 is also in communication with a storage device 1230. The storage device 1230 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 1230 stores a program 1215 for controlling the processor 1210. The processor 1210 performs instructions of the program 1215, and thereby operates in accordance any embodiments of the present invention described herein. For example, the processor 1210 may access a database that stores information about a plurality of members. The processor 1210 might further execute a spreadsheet component for the manipulation of multiple rows and columns of cells that contain content, the spreadsheet component being adapted to (i) receive a user-defined formula entered into a cell, and (ii) generate a change event in response to the formula defined by the user. The processor 1210 may further execute a spreadsheet add-in component adapted to: (i) receive the change event from the spreadsheet component, (ii) translate the user-defined formula associated with the change event and create a component-defined formula associated with the database, and (iii) arrange for information associated with the component-defined formula to be placed into the cell.

As used herein, information may be "received" by or "transmitted" to, for example: (i) the apparatus 1200 from other devices; or (ii) a software application or module within the apparatus 1200 from another software application, module, or any other source. As shown in FIG. 12, the storage device 1230 may also store a local information database 1260 according to some embodiments. The local information database 1260 may, for example, store information about some or all of the metadata associated with a multidimensional data source, OLAP cube, data warehouse, or any other data source.

The illustration and accompanying descriptions of devices and databases presented herein are exemplary, and any number of other arrangements could be employed besides those suggested by the figures. For example, multiple databases associated with different types of business information might be associated with the apparatus 1200. Similarly, the local information database 1260 may store different types of additional information that may be helpful when matching user entered name strings with database members, such as spelling variations (including misspellings and country-specific spelling variations), aliases (e.g., nicknames), and/or language variations (e.g., translated names).

Figure 13:
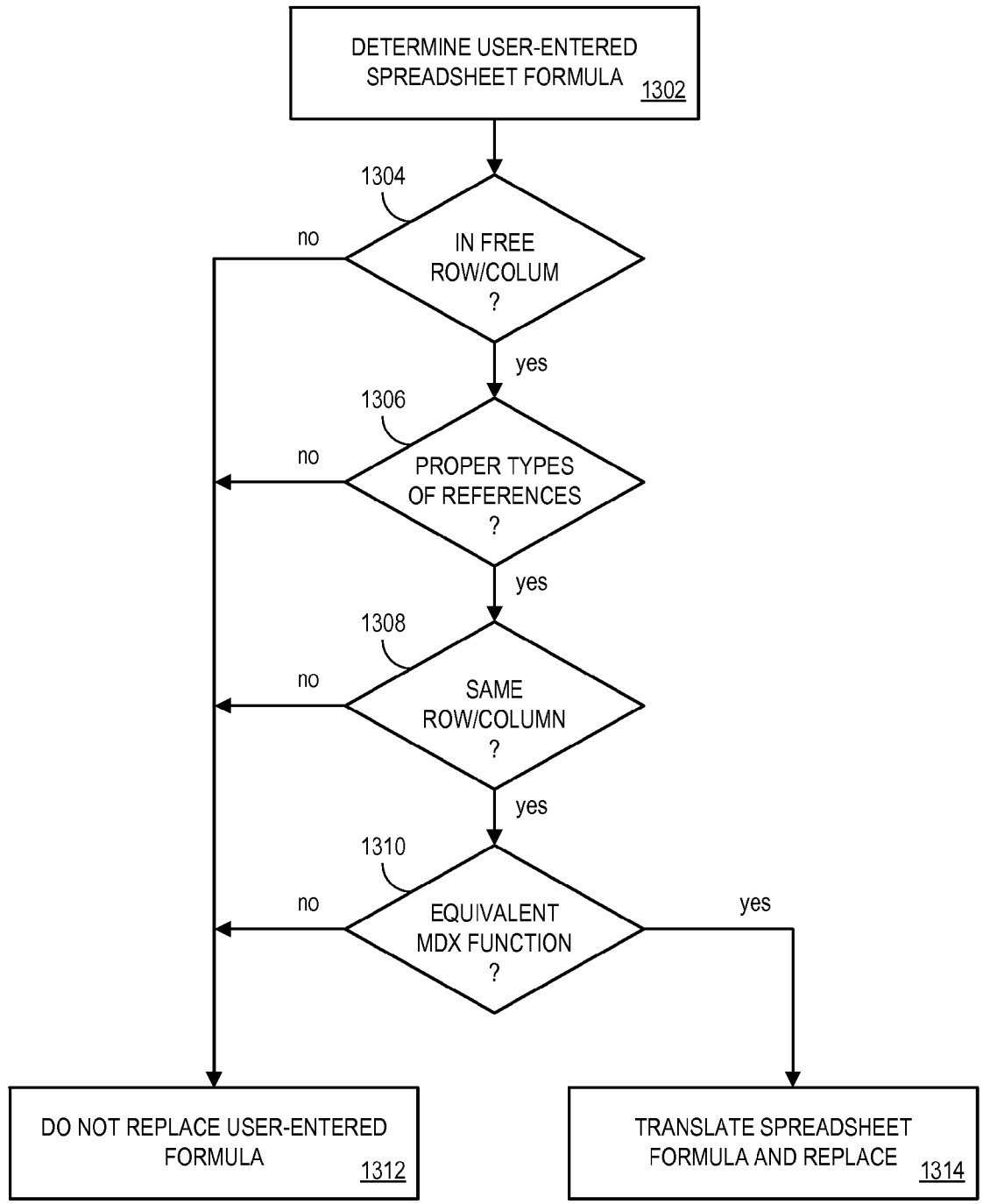
FIG. 13 is a flow diagram of a method according to some embodiments.

According to some embodiments, a user-entered formula might be evaluated to determine whether or not it will be translated into a persistent MDX calculated member. For example, FIG. 13 is a flow diagram of a method according to some embodiments. At 1302, it is determined that a user-entered spreadsheet formula has been entered. For example, a change indication may be received at the analyzer add-in from a spreadsheet application (e.g., an Excel OnSheetChange event might be received). The change indication may be associated with an Excel formula entered by a user into a spreadsheet cell. According to some embodiments, no further action is taken if an event indicates that multiple cells have been simultaneously changed.

In response to the change indication, it may be determined at 1304 whether or not the indication is associated with a spreadsheet cell that is located in a "free" row and/or column. Note that if a spreadsheet cell is located at the intersection of a row/column associated with other members, translation of the entered formula may not be appropriate. If the change indication is not properly located at 1304, the method may end at 1312.

At 1306, it may be determined whether or not the references within the Excel formula of the proper type. For example, the user-defined spreadsheet formula may associated with at least one source spreadsheet reference, in which case this condition might include verifying that: (i) all source spreadsheet references are relative references, or (ii) all source spreadsheet references are absolute references. If the references are not of the proper type, the method may end at 1312.

It might also be determined whether all of the source cells in a formula are located in a single row (for column formulas) or a single column (for row formulas) at 1308. That is, the spreadsheet formula may be associated with at least one source spreadsheet cell and this pre-determined condition may include verifying that: (i) the spreadsheet formula is a row formula and all source spreadsheet cells are in a single spreadsheet column, or (ii) the spreadsheet formula is a column formula and all source spreadsheet cells are in a single spreadsheet row. If the source cells are not located in the single row/column, the method may end at 1312.

At 1310, it may be determined whether or not the Excel function entered by the user is mapped to an equivalent MDX language expression (e.g., by verifying that the spreadsheet formula is mapped to an equivalent multidimensional language statement). By way of example only, Table I illustrates some types of Excel functions and associated MDX language expressions.

TABLE I

Formula Mapping

| Excel Function | MDX Expression |
| --- | --- |
| SUM ( , . . . , ) | SUM ({ , . . . , }) |
| AVERAGE ( , . . . , ) | AVERAGE ({ , . . . , }) |
| ABS ( ) | ABS ( ) |
| ISBLANK( ) | ISEMPTY( ) |
| AND ( , . . . , ) | . . . AND . . . AND . . . |
| OR ( , . . . , ) | . . . OR . . . OR . . . |
| IF (cond, value1, value2) | IIF (cond, value1, value2) |
| +, −, *, /, =, <, > | +, −, *, /, =, <, > |
| MIN ( , . . . , ) | MIN ({ , . . . , }) |
| MAX ( , . . . , ) | MAX ({ , . . . , }) |
| MEDIAN ( , . . . , ) | MEDIAN ({ , . . . , }) |
| COUNT ( , . . . , ) | Count ({ , . . . , }, EXCLUDEEMPTY) |

Note that any other type of spreadsheet might be similarly mapped to an appropriate multidimensional query expression (and translated) as appropriate.

When all of the conditions of 1304, 1306, 1308, and 1310 have been satisfied, the analyzer add-in may translate the spreadsheet formula and replace the information in the spreadsheet cell at 1314. Moreover, a visual or audible effect may indicate to the user that the formal has been successfully converted.

As a result of embodiments described herein, a user may be able to create spreadsheet displays of business information more quickly as compared to prior approaches. Moreover, embodiments may help reduce errors associated with the definition of such reports and displays (e.g., because the user does not need to remember and enter MDX specific syntax).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the applications and databases described herein may be combined or stored in separate systems). Similarly, although a particular information flow and user interactions have been given as examples, other and/or additional steps may be performed in accordance with any embodiments described herein. For example, although the dynamic matching of information may be helpful to a user, in some situations he or she may want to avoid using this feature (e.g., when entering information in a portion of a spreadsheet that is not related to a multidimensional database). As a result, a toolbar selection might be provided such that the dynamic determination use of name strings can be deactivated by a user.

Applicants have discovered that embodiments described herein may be particularly useful in connection with an access of information from a multidimensional data source via a spreadsheet application. Note, however, that other types of applications and databases, including transactional and relational databases, may also benefit from the invention. Similarly, although some embodiments have been described in connection with the MDX language, other translations of spreadsheet formulas may be performed in accordance with any of the embodiments described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory computer-readable medium having stored thereon processor-executable instructions, to facilitate use of a spreadsheet application to access information stored in a multidimensional data source having an associated metadata structure, that when executed by a processor result in the following:
    pre-loading, by an analyzer module executing as a plug-in component of the spreadsheet application, names associated with a plurality of members of the multidimensional data source defined in the associated metadata structure;
    after said pre-loading, receiving, at the analyzer module, a change indication from the spreadsheet application, the change indication being associated with a spreadsheet formula of the spreadsheet application entered by a user into a spreadsheet cell;
    in response to the change indication, automatically translating, by the analyzer module, the spreadsheet formula into a multidimensional expression calculation associated with the multidimensional data source based at least in part on the pre-loaded names; and
    automatically removing, by the analyzer module, the spreadsheet formula from the spreadsheet cell and replacing the spreadsheet formula with the automatically generated multidimensional expression calculation.

2. The medium of claim 1, wherein the multidimensional expression calculation is associated with a source member, and the process steps further comprise:
    persisting information associated with the multidimensional expression calculation in the spreadsheet cell even when a cell associated with the source member is deleted or moved via the spreadsheet application.

3. The medium of claim 1, wherein the process steps further comprise:
    prior to translating the spreadsheet formula, determining that the user-entered spreadsheet formula satisfies at least one pre-determined condition.

4. The medium of claim 3, wherein the pre-determined condition includes verifying that the spreadsheet cell where the user entered the spreadsheet formula comprises at least one of a free spreadsheet column or a free spreadsheet row.

5. The medium of claim 3, wherein the spreadsheet formula is associated with at least one source spreadsheet reference and the pre-determined condition includes verifying that: (i) all source spreadsheet references are relative references, or (ii) all source spreadsheet references are absolute references.

6. The medium of claim 3, wherein the spreadsheet formula is associated with at least one source spreadsheet cell and the pre-determined condition includes verifying that: (i) the spreadsheet formula is a row formula and all source spreadsheet cells are in a single spreadsheet column, or (ii) the spreadsheet formula is a column formula and all source spreadsheet cells are in a single spreadsheet row.

7. The medium of claim 3, wherein the pre-determined condition includes verifying that the spreadsheet formula is mapped to an equivalent multidimensional language statement.

8. The medium of claim 1, wherein the multidimensional data source comprises an online analytic processing cube.

9. The medium of claim 1, wherein the process steps further comprise:
    prior to receiving the change indication, receiving a user-defined name to be associated with the multidimensional expression calculation; and
    assigning the user-defined name to the multidimensional expression calculation.

10. The medium of claim 1, wherein no user-define name was received prior to the receiving the change indication, and the process steps further comprise:
    assigning an analyzer module-generated name to the multidimensional expression calculation.

11. The medium of claim 10, wherein the process steps further comprise:
    subsequent to said assigning, receiving a user-defined name in connection with the multidimensional expression calculation, and replacing the analyzer module-generated name with the user-defined name.

12. The medium of claim 1, wherein the process steps further include:
    receiving, at the analyzer module, a member recognition deactivation selection from the user;
    receiving, at the analyzer module, an additional change indication from the spreadsheet application; and
    preventing, by the analyzer module, a translation and replacement responsive to the additional change indication in accordance with the member recognition deactivation selection.

13. The medium of claim 1, wherein the process steps further comprise:
    providing to the user an indication that the translation and replacement were performed.

14. The medium of claim 1, wherein the formula is associated with at least one of: (i) a sum, (ii) an average, (iii) an absolute value, (iv) a blank determination, (v) a Boolean operation, (vi) a conditional statement, (vii) a minimum determination, (viii) a maximum determination, (ix) a count operation, or (x) an evaluation of mathematical relationship.

15. A system, comprising:
    a database storing information about a plurality of members and having an associated metadata structure defining names for the members;
    a spreadsheet component to:
        receive a user-defined formula entered into a cell, and
        generate a change event in response to the formula defined by the user; and
    a spreadsheet add-in component including the processor executing instructions to:
        pre-load names associated with the plurality of members as defined in the associated metadata structure, after the names are pre-loaded, receive the change event from the spreadsheet component, automatically translate the user-defined formula associated with the change event and create a component-defined formula associated with the database based at least in part on the pre-loaded names, remove the user-defined formula from the cell; and arrange for the component-defined formula to be placed into the cell.

16. The system of claim 15, wherein the database is associated with a multi-dimensional data source.

17. A method to facilitate a display to a user of information stored in an external database, comprising:

pre-loading, by an analyzer add-in component of a spreadsheet application, names of a plurality of members stored in the external database, receiving, at the analyzer add-in, a change indication from the spreadsheet application, the change indication being associated with a spreadsheet formula entered by a user into a spreadsheet cell;

in response to the change indication, automatically converting, by the analyzer add-in, the spreadsheet formula into a calculated member associated with the external database based at least in part on the pre-loaded names; and automatically removing, by the analyzer add-in, the spreadsheet formula from the spreadsheet cell and replacing the spreadsheet formula with the calculated member.

18. The method of claim 17, wherein the external database comprises a database remote from a device executing the spreadsheet application and the analyzer add-in.

19. The method of claim 18, wherein said converting is performed based at least in part on information stored locally to the analyzer add-in.

* * * * *